(12) United States Patent
Yao et al.

(10) Patent No.: US 11,434,159 B2
(45) Date of Patent: Sep. 6, 2022

(54) DEVICE AND METHOD FOR SULPHUR CYCLE-BASED ADVANCED DENITRIFICATION OF WASTE WATER COUPLING AUTOTROPHIC DENITRIFICATION AND HETEROTROPHIC DENITRIFICATION

(71) Applicant: Beijing Jiaotong University, Beijing (CN)

(72) Inventors: Hong Yao, Beijing (CN); Anming Yang, Beijing (CN); Sheng Tian, Beijing (CN)

(73) Assignee: Beijing Jiaotong University, Beijing (CN)

( * ) Notice: Subject to any disclaimer, the term of this patent is extended or adjusted under 35 U.S.C. 154(b) by 52 days.

(21) Appl. No.: 17/081,596

(22) Filed: Oct. 27, 2020

(65) Prior Publication Data
US 2021/0317025 A1  Oct. 14, 2021

(30) Foreign Application Priority Data
Apr. 10, 2020 (CN) .......................... 202010279341.2

(51) Int. Cl.
*C02F 9/00* (2006.01)
*B01D 53/52* (2006.01)
(Continued)

(52) U.S. Cl.
CPC ................ *C02F 9/00* (2013.01); *B01D 53/52* (2013.01); *B01D 53/77* (2013.01);
(Continued)

(58) Field of Classification Search
CPC ................ C02F 3/302; C02F 2101/101; C02F 2101/16; C02F 2101/163; C02F 2103/18; C02F 2209/005; C02F 2209/06; C02F 2209/15; C02F 2209/22; C02F 2303/02; C02F 3/00; C02F 3/006; C02F 3/28;
(Continued)

(56) References Cited

U.S. PATENT DOCUMENTS

2013/0256223 A1* 10/2013 Chen ....................... C02F 3/025
210/205

* cited by examiner

*Primary Examiner* — Claire A Norris
(74) *Attorney, Agent, or Firm* — Caesar Rivise, PC

(57) ABSTRACT

The present invention provides a device and method for sulphur cycle-based advanced denitrification of wastewater coupling autotrophic denitrification and heterotrophic denitrification, and belongs to the technical field of wastewater treatment. The unit generating hydrogen sulfide during the wastewater treatment process adopts a lye to absorb hydrogen sulfide; the absorbed sulfide is introduced into an anoxic tank that removes nitrate nitrogen through sulfur-based autotrophic denitrification; and the remaining organic matters in the anaerobic methane-producing reaction tank are subjected to heterotrophic denitrification in the anoxic tank, and the anoxic unit combines the sulfur-based autotrophic denitrification with the heterotrophic denitrification of organic matters. The coupling of sulfur-based autotrophic denitrification and heterotrophic denitrification strengthens the removal of nitrate nitrogen. The biogas desulfurization process system only absorbs hydrogen sulfide and uses the absorbed sulfide in an anoxic system to realize the recovery and utilization of sulfur.

20 Claims, 1 Drawing Sheet

(51) Int. Cl.
*B01D 53/77* (2006.01)
*C02F 1/00* (2006.01)
*C02F 3/00* (2006.01)
*C02F 3/12* (2006.01)
*C02F 3/28* (2006.01)
*C02F 3/30* (2006.01)
*C02F 101/10* (2006.01)

(52) U.S. Cl.
CPC .......... *B01D 2251/604* (2013.01); *C02F 1/00* (2013.01); *C02F 3/006* (2013.01); *C02F 3/1278* (2013.01); *C02F 3/2893* (2013.01); *C02F 3/302* (2013.01); *C02F 2001/007* (2013.01); *C02F 2101/101* (2013.01); *C02F 2201/005* (2013.01); *C02F 2209/06* (2013.01); *C02F 2209/08* (2013.01); *C02F 2209/14* (2013.01); *C02F 2209/22* (2013.01); *C02F 2209/265* (2013.01); *C02F 2209/40* (2013.01); *C02F 2301/046* (2013.01)

(58) Field of Classification Search
CPC ... C02F 3/2893; B01D 2258/05; B01D 53/52; B01D 2257/304; B01D 53/84; B01D 2251/604; B01D 2257/30
USPC .......................................... 210/605, 620, 603
See application file for complete search history.

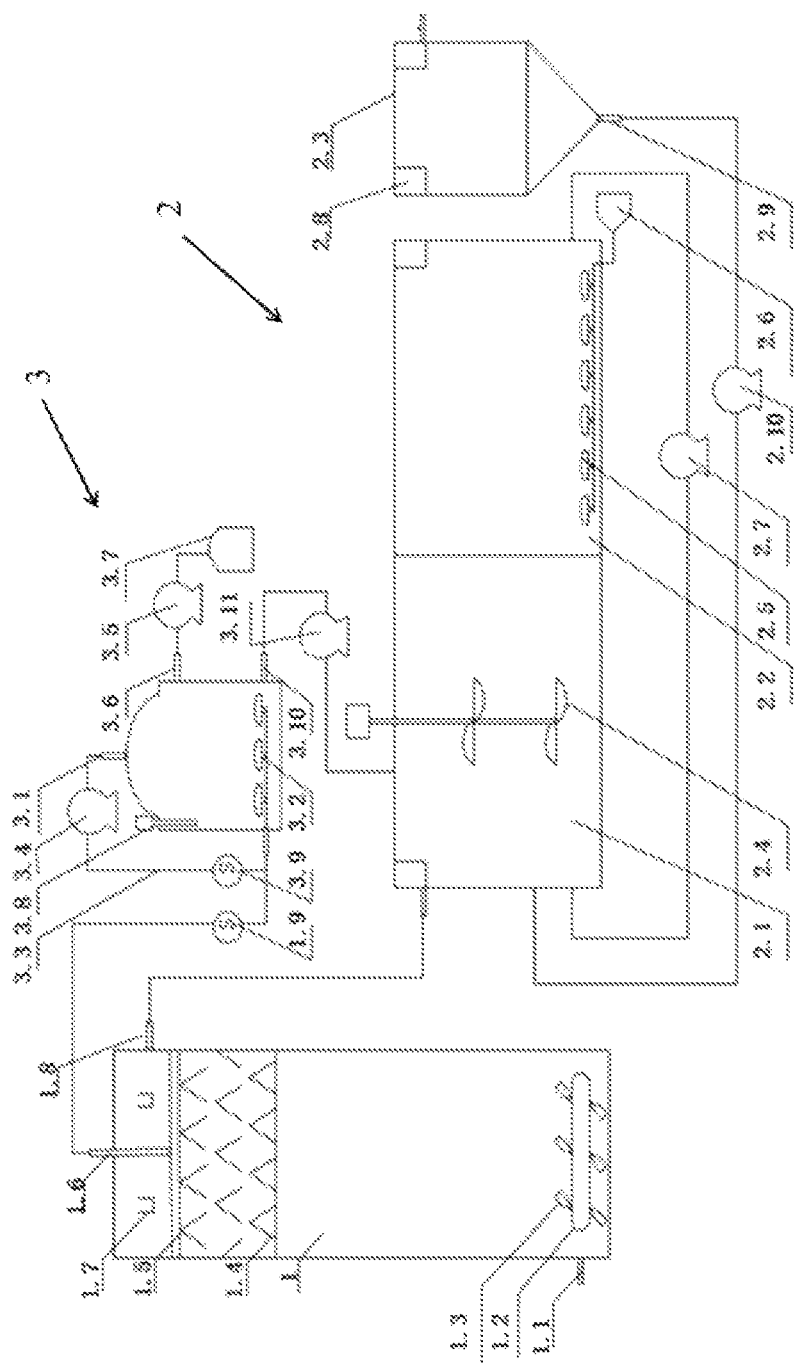

DEVICE AND METHOD FOR SULPHUR CYCLE-BASED ADVANCED DENITRIFICATION OF WASTE WATER COUPLING AUTOTROPHIC DENITRIFICATION AND HETEROTROPHIC DENITRIFICATION

TECHNICAL FIELD

The present invention relates to the technical field of wastewater treatment, and in particular to a device and method for sulphur cycle-based advanced denitrification of wastewater coupling autotrophic denitrification and heterotrophic denitrification.

BACKGROUND

According to the "National Environmental Statistics Bulletin", the ammoniacal nitrogen ($NH_4^+$—N) emitted from industrial sources accounts for 9.4% of the total $NH_4^+$—N emission. The industrial wastewater produced in industry of nitrogenous fertilizers, pharmaceuticals, coking or the like has a high concentration of nitrogen pollutants with a low C/N. In addition, a traditional heterotrophic denitrification process used for treating the wastewater needs to consume a large number of organic carbon sources, which results in high operating expense for wastewater treatment and increasing the cost of the wastewater treatment plant and the corporate wastewater treatment. Meanwhile, the traditional heterotrophic denitrification may cause huge waste of chemical agents.

The general industrial wastewater includes a certain concentration of sulfur, and a large amount of hydrogen sulfide will be produced during anaerobic treatment or sludge treatment, which requires biogas desulfurization. $S^{2-}$ or S can be used to achieve the removal of TN in wastewater through sulfur-based autotrophic denitrification. Using sulfur to enhance the removal of TN in wastewater can reduce the consumption of organic carbon sources, improve the TN-removing effect of the system, and reduce the output of sludge. Using the sulfur contained in wastewater to strengthen the removal of TN and realize the green and sustainable wastewater treatment with pollution controlled by pollutants has important economic and social values.

SUMMARY

The present invention aims to provide a method for combining the desulfurization process and the sulfur-based autotrophic denitrification process of a wastewater treatment plant to realize the combination of desulfurization and denitrification; and through the coupling with heterotrophic denitrification, this method improves the TN-removing effect and reduces the operating cost. A device and method for sulphur cycle-based advanced denitrification of wastewater coupling autotrophic denitrification and heterotrophic denitrification is provided to solve at least one of the technical problems mentioned in the above background.

To achieve the foregoing objective, the present invention adopts the following technical solutions:

In one aspect, the present invention provides a device for sulphur cycle-based advanced denitrification of wastewater coupling autotrophic denitrification and heterotrophic denitrification, including an anaerobic methane-producing reaction tank, a nitrification and denitrification reactor, and a sulfur recovery reaction tank that sequentially communicate with each other.

The bottom of the anaerobic methane-producing reaction tank is provided with a water distribution pipe connected to a duckbill valve, and an inlet pipe of the anaerobic methane-producing reaction tank communicates with the water distribution pipe.

The nitrification and denitrification reactor is sequentially provided with an anoxic denitrification zone, an aerobic nitrification zone and a sedimentation tank. In addition, an outlet pipe of the anaerobic methane-producing reaction tank is connected to the anoxic denitrification zone.

The top of the sulfur recovery reaction tank is provided with a gas collection pipe; the bottom of the sulfur recovery reaction tank is provided with a gas distribution device; a circulation pipe on the gas collection pipe is connected to the gas distribution device, and a circulation pump is disposed on the circulation pipe.

Preferably, the top of the anaerobic methane-producing reaction tank is provided with a three-phase separator, a gas chamber and a biogas pipe; the top of the three-phase separator is provided with a first outlet weir connected to the outlet pipe; and a first hydrogen sulfide gas analyzer is installed on the biogas pipe.

Preferably, the anoxic denitrification zone is equipped with a stirrer; the aerobic nitrification zone is provided with an aerator connected to a blower; the aerobic nitrification zone is connected to the anoxic denitrification zone via a nitrification liquid return pump; the top of the sedimentation tank is provided with a second outlet weir; and the bottom of the sedimentation tank is provided with a sludge return pipe connected to the anoxic denitrification zone via a sludge return pump.

Preferably, the sulfur recovery reaction tank is provided with a lye feeding pipe connected to a lye feeding pump; and the lye feeding pump is connected to a lye storage tank.

Preferably, a pH probe is installed in the sulfur recovery reaction tank; and a second hydrogen sulfide gas analyzer is installed on the circulation pipe.

Preferably, the bottom of the sulfur recovery reaction tank is provided with a lye return pipe connected to the anoxic denitrification zone via a lye return pump.

In another aspect, the present invention also provides a denitrification method for wastewater using the device for sulphur cycle-based advanced denitrification of wastewater coupling autotrophic denitrification and heterotrophic denitrification described above, including the following steps:

step S110: adding anaerobic granular sludge to the anaerobic methane-producing reaction tank, and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank enters the sulfur recovery reaction tank, adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via the lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the $NH_4^+$—N removal rate to greater than 95%, where, if the indicators do not meet the requirements, the aeration volume is increased by 5% to 10%, and 2 current HRTs are adopted; and step S170: subjecting the mixed solution in the nitrification and denitrification reaction tank to mud-water separation in the sedimentation tank, and discharging the effluent up to standard.

Preferably, in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

Preferably, in step S110, when $R_{COD}$<80%, the water intake (Q) is reduced by 5% to 10%, and 2 current HRTs are adopted; If $R_{COD}$ increases, the current water intake is maintained, and if $R_{COD}$ does not increase, the water intake is further reduced by 5% to 10%, and 2 current HRTs are adopted; and the process is repeated until $R_{COD}$>80%; when $R_{COD}$>85%, the water intake (Q) is increased by 5% to 10%, and 2 HRTs are adopted; if $R_{COD}$ continuously decreases, the current water intake is maintained, and if $R_{COD}$ does not decrease, the water intake is further increased by 5% to 10%, and 2 current HRTs are adopted; and the process is repeated until $R_{COD}$<85%.

Beneficial effects of the present invention: The present invention organically combines the desulfurization process and the sulfur-based autotrophic denitrification process of a wastewater treatment plant to realize the combination of desulfurization and denitrification through the circulation of sulfur in the treatment system and the change of valency of sulfur. Moreover, the coupling of autotrophic denitrification and heterotrophic denitrification further improves the TN removal effect and reduces the amount of added carbon sources, where the hydrogen sulfide produced by the anaerobic system is absorbed with a lye and then used for the autotrophic denitrification at the preceding stage, reducing the desulfurization procedure.

The additional aspects and advantages of the present invention will be partially given in the following description, and become clear in the following description, or be learned through the practice of the present invention.

BRIEF DESCRIPTION OF DRAWINGS

To describe the technical solutions in the examples of the present invention more clearly, the following briefly introduces the accompanying drawings required for describing the examples. Apparently, the accompanying drawings in the following description show merely some examples of the present invention, and a person of ordinary skill in the art FIG. 1 is a structural diagram of the device for sulphur cycle-based advanced denitrification of waste water coupling autotrophic denitrification and heterotrophic denitrification according to an example of the present invention.

In the FIGURE: 1 represents an anaerobic methane-producing reaction tank; 2 represents a nitrification and denitrification reactor; 3 represents a sulfur recovery reaction tank; 1.2 represents a water distribution pipe; 1.3 represents a duckbill valve; 1.1 represents an inlet pipe; 2.1 represents an anoxic denitrification zone; 2.2 represents an aerobic nitrification zone; 2.3 represents a sedimentation tank; 1.8 represents an outlet pipe; 3.1 represents a gas collection pipe; 3.2 represents a gas distribution device; 3.4 represents a circulation pipe; 3.3 represents a circulation pump; 1.4 represents a three-phase separator; 1.5 represents a gas chamber; 1.6 represents a biogas pipe; 1.7 represents a first outlet weir; 1.9 represents a first hydrogen sulfide gas analyzer; 2.4 represents a stirrer; 2.5 represents an aerator; 2.6 represents a blower; 2.7 represents a nitrification liquid return pump; 2.8 represents a second outlet weir; 2.9 represents a sludge return pipe; 2.10 represents a sludge return pump; 3.5 represents a lye feeding pump; 3.6 represents a lye feeding pipe; 3.7 represents a lye storage tank; 3.8 represents a pH probe; 3.9 represents a second hydrogen sulfide gas analyzer; 3.10 represents a lye return pipe; and 3.11 represents a lye return pump.

DETAILED DESCRIPTION

The implementations of the present invention are described below in detail. Examples of the implementations are shown in the accompanying drawings. The same or similar numerals represent the same or similar elements or elements having the same or similar functions throughout the specification. The implementations described below with reference to the accompanying drawings are exemplary, and are only used to explain the present invention but should not be construed as a limitation to the present invention.

Those skilled in the art can understand that, unless otherwise defined, all terms (including technical terms and scientific terms) used herein have the same meanings as those commonly understood by those of ordinary skill in the art to which the present invention belongs. It should also be understood that terms such as those defined in general dictionaries should be understood as having meanings consistent with the meanings in the context of the prior art, and unless otherwise defined herein, these terms will not be explained in ideal or overly-formal meanings.

Those skilled in the art can understand that, unless otherwise stated, the singular forms "a", "an", "said" and "the" used herein may also include plural forms. It should be further understood that the word "comprising" used in the specification of the present invention refers to the presence of the described features, integers, steps, operations, elements and/or components, but does not exclude the presence or addition of one or more other features, integers, steps, operations, elements, components, and/or a combination thereof.

In the description of the present invention, it should be understood that orientation or position relationships indicated by terms "central", "upper", "lower", "front", "rear", "left", "right", "vertical", "horizontal", "top", "bottom", "inside", "outside", etc. are orientation or position relationships as shown in the drawings, and these terms are used merely to facilitate description of the present invention and simplify the description, but not to indicate or imply that the mentioned device or elements must have a specific orientation and must be constructed and operated in a specific orientation. Therefore, these terms cannot be understood as a limitation to the present invention.

In the description of the specification, reference to the term "one embodiment", "some embodiments", "an example", "a specific example", "some examples" or the like means that a specific feature, structure, material or characteristic described in combination with the embodiment(s) or example(s) are included in at least one embodiment or example of the present invention. Moreover, the particular features, structures, materials or characteristics described may be combined in any suitable manner in any one or more embodiments or examples. In addition, those skilled in the art may combine different embodiments or examples described in the specification or features in different embodiments or examples without any contradiction.

In the description of the specification, it should be noted that the terms such as "first" and "second" are used only for the purpose of description and cannot be understood as indicating or implying relative importance or implicitly indicating the number of technical features denoted. Therefore, features defined by "first" and "second" may explicitly or implicitly include at least one of the features. In the description of the present invention, "a plurality of" means two or more, unless otherwise specifically defined.

Unless otherwise clearly specified and defined, the terms "installed", "connected with", "connected to" and "disposed" should be comprehended broadly. For example, these terms may be comprehended as being fixedly connected or disposed, detachably connected or disposed, or integrally connected and disposed. A person of ordinary skill in the art may understand specific meanings of the foregoing terms in the present invention based on a specific situation.

In order to facilitate the understanding of the present invention, the present invention will be further explained below through specific examples in conjunction with the drawings, but these specific examples do not constitute a limitation to the examples of the present invention.

Those skilled in the art should understand that the drawings are only schematic diagrams of examples, and the components in the drawings are not necessary for implementing the present invention.

EXAMPLE

As shown in FIG. 1, the example of the present invention provides a device for sulphur cycle-based advanced denitrification of waste water coupling autotrophic denitrification and heterotrophic denitrification, including an anaerobic methane-producing reaction tank 1, a nitrification and denitrification reactor 2, and a sulfur recovery reaction tank 3 that sequentially communicate with each other.

The bottom of the anaerobic methane-producing reaction tank 1 is provided with a water distribution pipe 1.2 connected to a duckbill valve 1.3, and an inlet pipe 1.1 of the anaerobic methane-producing reaction tank 1 communicates with the water distribution pipe 1.2.

The nitrification and denitrification reactor 2 is sequentially provided with an anoxic denitrification zone 2.1, an aerobic nitrification zone 2.2 and a sedimentation tank 2.3; and an outlet pipe 1.8 of the anaerobic methane-producing reaction tank 1 is connected to the anoxic denitrification zone 2.1.

The top of the sulfur recovery reaction tank 3 is provided with a gas collection pipe 3.1, the bottom of the sulfur recovery reaction tank 3 is provided with a gas distribution device 3.2, a circulation pipe 3.4 on the gas collection pipe 3.1 is connected to the gas distribution device 3.2, and a circulation pump 3.3 is disposed on the circulation pipe 3.4.

The top of the anaerobic methane-producing reaction tank 1 is provided with a three-phase separator 1.4, a gas chamber 1.5 and a biogas pipe 1.6; the top of the three-phase separator 1.4 is provided with a first outlet weir 1.7 connected to the outlet pipe 1.8; and a first hydrogen sulfide gas analyzer 1.9 is installed on the biogas pipe 1.6.

The anoxic denitrification zone is equipped with a stirrer 2.4; the aerobic nitrification zone 2.2 is provided with an aerator 2.5 connected to a blower 2.6; the aerobic nitrification zone 2.2 is connected to the anoxic denitrification zone 2.1 via a nitrification liquid return pump 2.7; the top of the sedimentation tank 2.3 is provided with a second outlet weir 2.8; and the bottom of the sedimentation tank 2.3 is provided with a sludge return pipe 2.9 connected to the anoxic denitrification zone 2.1 via a sludge return pump 2.10.

The sulfur recovery reaction tank 3 is provided with a lye feeding pipe 3.6 connected to a lye feeding pump 3.5, and the lye feeding pump 3.5 is connected to a lye storage tank 3.7.

A pH probe 3.8 is installed in the sulfur recovery reaction tank 3, and a second hydrogen sulfide gas analyzer 3.9 is installed on the circulation pipe 3.4.

The bottom of the sulfur recovery reaction tank 3 is provided with a lye return pipe 3.10 connected to the anoxic denitrification zone 2.1 via a lye return pump 3.11.

A denitrification method for waste water using the above device included the following steps:

Step S110: Anaerobic granular sludge was added to the anaerobic methane-producing reaction tank 1 at a sludge feeding concentration (MLSS) of 10 g/L to 20 g/L, the temperature in the anaerobic methane-producing reaction tank was adjusted to 30° C. to 35° C., and the pH was adjusted to 6.5 to 8.3.

The water intake (Q) or HRT of the anaerobic methane-producing reaction tank were controlled according to the $R_{COD}$ to control the $R_{COD}$ in the anaerobic methane-producing reaction tank at 80% to 85%. When $R_{COD}<80\%$, the water intake (Q) is reduced by 5% to 10%, and 2 current HRTs are adopted; If $R_{COD}$ increases, the current water intake is maintained, and if $R_{COD}$ does not increase, the water intake is further reduced by 5% to 10%, and 2 current HRTs are adopted; and the process is repeated until $R_{COD}>80\%$; when $R_{COD}>85\%$, the water intake (Q) is increased by 5% to 10%, and 2 HRTs are adopted; if $R_{COD}$ continuously decreases, the current water intake is maintained, and if $R_{COD}$ does not decrease, the water intake is further increased by 5% to 10%, and 2 current HRTs are adopted; and the process is repeated until $R_{COD}<85\%$.

Step S120: After the gas produced in the anaerobic methane-producing reaction tank 1 entered the sulfur recovery reaction tank 3, a lye was added to control the pH at 7.5 to 8.5, and the gas flow was controlled via the circulation pump to adjust the hydrogen sulfide removal rate in the sulfur recovery reaction tank to greater than 85%.

Step S130: A traditional activated sludge was inoculated to the nitrification and denitrification reactor, and the sludge concentration, the operating pH and the sludge return ratio were controlled at 3,000 mg/L to 5,000 mg/L, 7.0 to 8.5, and 50% to 100%, respectively.

Step S140: The DO in the anoxic denitrification zone was controlled to less than 0.5 mg/L, the mixed solution in the aerobic nitrification zone was returned to the anoxic denitrification zone via the nitrification liquid return pump, and the nitrification liquid return ratio was controlled at 100% to 300%.

The effluent from the anaerobic methane-producing reaction tank was introduced to the anoxic denitrification zone at a position of the front end of the anoxic denitrification zone, and the lye in the sulfur recovery reaction tank was introduced to the anoxic denitrification zone at a position of ¼ to ½ of the total length of the anoxic denitrification zone away from the front end via the lye return pump.

Step S160: The aeration volume of the nitrification and denitrification reactor was adjusted via the aerator to control the DO in the aerobic nitrification zone at 0.5 mg/L to 3 mg/L and to control the $NH_4^+$—N to less than 5 mg/L or the $NH_4^+$—N removal rate to greater than 95%, where, if the indicators do not meet the requirements, the aeration volume is increased by 5% to 10%, and 2 current HRTs are adopted.

Step S170: The mixed solution in the nitrification and denitrification reaction tank was subjected to mud-water separation in the sedimentation tank, and the effluent up to standard was discharged.

In summary, for the device and method for sulphur cycle-based advanced denitrification of waste water coupling autotrophic denitrification and heterotrophic denitrification described in the example of the present invention, the unit generating hydrogen sulfide during the waste water treatment process (mainly the anaerobic treatment and waste water treatment unit) adopts a lye (sodium hydroxide and the like) to absorb hydrogen sulfide; the absorbed sulfide is introduced into an anoxic tank that removes nitrate nitrogen through sulfur-based autotrophic denitrification; and the remaining organic matters in the anaerobic methane-producing reaction tank are subjected to heterotrophic denitrification in the anoxic tank, and the anoxic unit combines the sulfur-based autotrophic denitrification with the heterotrophic denitrification of organic matters. The coupling of sulfur-based autotrophic denitrification and heterotrophic denitrification strengthens the removal of nitrate nitrogen. The biogas desulfurization process system only absorbs hydrogen sulfide and uses the absorbed sulfide in an anoxic system to realize the recovery and utilization of sulfur, which reduces the traditional desulfurization procedure.

A person of ordinary skill in the art may understand that the components of the device in the example of the present invention can be distributed in the device in the example according to the description in the example, or can be changed accordingly and located in one or more devices different from this example. The components in the above example can be combined into one component, or further disassembled into a plurality of sub-components.

The above merely describes a preferred specific implementation of the present invention, but the protection scope of the present invention is not limited thereto. A person skilled in the art can easily conceive modifications or replacements within the technical scope of the present invention, and these modifications or replacements shall fall within the protection scope of the present invention. Therefore, the protection scope of the present invention should be subject to the protection scope of the claims.

What is claimed is:

1. A device for sulphur cycle-based advanced denitrification of waste water coupling autotrophic denitrification and heterotrophic denitrification, comprising an anaerobic methane-producing reaction tank, a nitrification and denitrification reactor, and a sulfur recovery reaction tank that communicate with each other; wherein, the bottom of the anaerobic methane-producing reaction tank is provided with a water distribution pipe connected to a duckbill valve, and an inlet pipe of the anaerobic methane-producing reaction tank communicates with the water distribution pipe;

the nitrification and denitrification reactor is sequentially provided with an anoxic denitrification zone, an aerobic nitrification zone and a sedimentation tank; and an outlet pipe of the anaerobic methane-producing reaction tank is connected to the anoxic denitrification zone; and the top of the sulfur recovery reaction tank is provided with a gas collection pipe, the bottom of the sulfur recovery reaction tank is provided with a gas distribution device, a circulation pipe on the gas collection pipe is connected to the gas distribution device, and a circulation pump is disposed on the circulation pipe.

2. The device for sulphur cycle-based advanced denitrification of waste water coupling autotrophic denitrification and heterotrophic denitrification according to claim 1, wherein: the top of the anaerobic methane-producing reaction tank is provided with a three-phase separator, a gas chamber and a biogas pipe; the top of the three-phase separator is provided with a first outlet weir connected to the outlet pipe; and a first hydrogen sulfide gas analyzer is installed on the biogas pipe.

3. The device for sulphur cycle-based advanced denitrification of waste water coupling autotrophic denitrification and heterotrophic denitrification according to claim 2, wherein: the anoxic denitrification zone is equipped with a stirrer; the aerobic nitrification zone is provided with an aerator connected to a blower; the aerobic nitrification zone is connected to the anoxic denitrification zone via a nitrification liquid return pump; the top of the sedimentation tank is provided with a second outlet weir; and the bottom of the sedimentation tank is provided with a sludge return pipe connected to the anoxic denitrification zone via a sludge return pump.

4. The device for sulphur cycle-based advanced denitrification of waste water coupling autotrophic denitrification and heterotrophic denitrification according to claim 3, wherein: the sulfur recovery reaction tank is provided with a lye feeding pipe connected to a lye feeding pump, and the lye feeding pump is connected to a lye storage tank.

5. The device for sulphur cycle-based advanced denitrification of waste water coupling autotrophic denitrification and heterotrophic denitrification according to claim 4, wherein: a pH probe is installed in the sulfur recovery reaction tank, and a second hydrogen sulfide gas analyzer is installed on the circulation pipe.

6. The device for sulphur cycle-based advanced denitrification of waste water coupling autotrophic denitrification and heterotrophic denitrification according to claim 5, wherein: the bottom of the sulfur recovery reaction tank is provided with a lye return pipe connected to the anoxic denitrification zone via a lye return pump.

7. A denitrification method for waste water using the device for sulphur cycle-based advanced denitrification of waste water coupling autotrophic denitrification and heterotrophic denitrification according to claim 1, comprising the following steps:

step S110: adding anaerobic granular sludge to the anaerobic methane-producing reaction tank, and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank enters the sulfur recovery reaction tank, adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via a lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the a $NH_4^+$—N removal rate to greater than 95%, wherein, if the indicators do not meet the requirements, the aeration volume is increased by 5% to 10%, and 2 HRTs are set; and step S170: subjecting the mixed solution in the nitrification and denitrification reaction tank to mud-water separation in the sedimentation tank, and discharging the effluent from the mud-water separation.

8. The method according to claim 7, wherein: in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

9. The method according to claim 8, wherein: in step S110, when $R_{COD}$<80%, the water intake (Q) is reduced by 5% to 10%, and 2 HRTs are set; If $R_{COD}$ increases, the current water intake is maintained, and if $R_{COD}$ does not increase, the water intake is further reduced by 5% to 10%, and 2 HRTs are set;

and the process is repeated until $R_{COD}$>80%; when $R_{COD}$>85%, the water intake (Q) is increased by 5% to 10%, and 2 HRTs are set; if $R_{COD}$ continuously decreases, the current water intake is maintained, and if $R_{COD}$ does not decrease, the water intake is further increased by 5% to 10%, and 2 HRTs are set; and the process is repeated until $R_{COD}$<85%.

10. A denitrification method for waste water using the device for sulphur cycle-based advanced denitrification of waste water coupling autotrophic denitrification and heterotrophic denitrification according to claim 2, comprising the following steps:

step S110: adding anaerobic granular sludge to the anaerobic methane-producing reaction tank (1), and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank (1) enters the sulfur recovery reaction tank (3), adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via a lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the $NH_4^+$—N removal rate to greater than 95%, wherein, if the indicators do not meet the requirements, the aeration volume is increased by 5% to 10%, and 2 HRTs are set; and step S170: subjecting the mixed solution in the nitrification and denitrification reaction tank to mud-water separation in the sedimentation tank, and discharging the effluent from the mud-water separation.

11. A denitrification method for waste water using the device for sulphur cycle-based advanced denitrification of waste water coupling autotrophic denitrification and heterotrophic denitrification according to claim 3, comprising the following steps:

step S110: adding anaerobic granular sludge to the anaerobic methane-producing reaction tank (1), and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank (1) enters the sulfur recovery reaction tank (3), adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via a lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the $NH_4^+$—N removal rate to greater than 95%, wherein, if the indicators do not meet the requirements, the aeration volume is increased by 5% to 10%, and 2 HRTs are set; and step S170: subjecting the mixed solution in the nitrification and denitrification reaction tank to mud-water separation in the sedimentation tank, and discharging the effluent from the mud-water separation.

12. A denitrification method for waste water using the device for sulphur cycle-based advanced denitrification of waste water coupling autotrophic denitrification and heterotrophic denitrification according to claim 4, comprising the following steps:

step S110: adding anaerobic granular sludge to the anaerobic methane-producing reaction tank (1), and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank (1) enters the sulfur recovery reaction tank (3), adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via a lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the $NH_4^+$—N removal rate to greater than 95%, wherein, if the indicators do not meet the requirements, the aeration volume is increased by 5% to 10%, and 2 HRTs are set; and step S170: subjecting the mixed solution in the nitrification and denitrification reaction tank to mud-water separation in the sedimentation tank, and discharging the effluent from the mud-water separation.

13. A denitrification method for waste water using the device for sulphur cycle-based advanced denitrification of waste water coupling autotrophic denitrification and heterotrophic denitrification according to claim 5, comprising the following steps:

step S110: adding anaerobic granular sludge to the anaerobic methane-producing reaction tank (1), and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank (1) enters the sulfur recovery reaction tank (3), adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via a lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the $NH_4^+$—N removal rate to greater than 95%, wherein, if the indicators do not meet the requirements, the aeration volume is increased by 5% to 10%, and 2 HRTs are set; and step S170: subjecting the mixed solution in the nitrification and denitrification reaction tank to mud-water separation in the sedimentation tank, and discharging the effluent from the mud-water separation.

14. A denitrification method for waste water using the device for sulphur cycle-based advanced denitrification of waste water coupling autotrophic denitrification and heterotrophic denitrification according to claim 6, comprising the following steps:

step S110: adding anaerobic granular sludge to the anaerobic methane-producing reaction tank (1), and controlling the water intake (Q) or hydraulic retention time (HRT) of the anaerobic methane-producing reaction tank according to the COD removal rate ($R_{COD}$) to control the $R_{COD}$ in the anaerobic methane-producing reaction tank at 80% to 85%;

step S120: after the gas produced in the anaerobic methane-producing reaction tank (1) enters the sulfur recovery reaction tank (3), adding a lye to control the pH at 7.5 to 8.5, and controlling the gas flow via the circulation pump to adjust the hydrogen sulfide removal rate in the sulfur recovery reaction tank to greater than 85%;

step S130: inoculating a traditional activated sludge to the nitrification and denitrification reactor, and controlling the sludge concentration at 3,000 mg/L to 5,000 mg/L, the operating pH at 7.0 to 8.5, and the sludge return ratio at 50% to 100%;

step S140: controlling the dissolved oxygen (DO) in the anoxic denitrification zone to less than 0.5 mg/L, returning the mixed solution in the aerobic nitrification zone to the anoxic denitrification zone via the nitrification liquid return pump, and controlling the nitrification liquid return ratio at 100% to 300%;

step S150: introducing the effluent from the anaerobic methane-producing reaction tank to the anoxic denitrification zone at a position of a front end of the anoxic denitrification zone, and introducing the lye in the sulfur recovery reaction tank to the anoxic denitrification zone at a position of ¼ to ½ of the total length of the anoxic denitration zone away from the front end via the lye return pump;

step S160: adjusting the aeration volume of the nitrification and denitrification reactor via the aerator to control the DO in the aerobic nitrification zone at 0.5 mg/L to 3 mg/L and to control the $NH_4^+$—N to less than 5 mg/L or the $NH_4^+$—N removal rate to greater than 95%, wherein, if the indicators do not meet the requirements, the aeration volume is increased by 5% to 10%, and 2 HRTs are set; and step S170: subjecting the mixed solution in the nitrification and denitrification reaction tank to mud-water separation in the sedimentation tank, and discharging the effluent from the mud-water separation.

15. The method according to claim 10, wherein: in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

16. The method according to claim 11, wherein: in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

17. The method according to claim 12, wherein: in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

18. The method according to claim 13, wherein: in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

19. The method according to claim 14, wherein: in step S110, the sludge feeding concentration (MLSS) is 10 g/L to 20 g/L, the temperature in the anaerobic methane-producing reaction tank is adjusted to 30° C. to 35° C., and the pH is adjusted to 6.5 to 8.3.

20. The method according to claim 15, wherein: in step S110, when $R_{COD}$<80%, the water intake (Q) is reduced by 5% to 10%, and 2 HRTs are set; If $R_{COD}$ increases, the current water intake is maintained, and if $R_{COD}$ does not increase, the water intake is further reduced by 5% to 10%, and 2 HRTs are set; and the process is repeated until $R_{COD}$>80%; when $R_{COD}$>85%, the water intake (Q) is increased by 5% to 10%, and 2 HRTs are set; if $R_{COD}$ continuously decreases, the current water intake is maintained, and if $R_{COD}$ does not decrease, the water intake is further increased by 5% to 10%, and 2 HRTs are set; and the process is repeated until $R_{COD}$<85%.

* * * * *